INVENTORS
Eduard R. de Vries &
William H. Riley, Jr.

BY Karl W. Flocks
ATTORNEY 3,187,068
METHOD OF MAKING REFLEX
REFLECTIVE SHEETING
Eduard R. de Vries, Huntingdon, and William H. Riley, Jr., Altoona, Pa., assignors to Prismo Safety Corporation, Huntingdon, Pa., a corporation of Pennsylvania
Filed Oct. 11, 1961, Ser. No. 144,426
7 Claims. (Cl. 264—1)

The present invention relates to method of making sheeting and more particularly to a method of making a reflex light reflecting sheet material.

Heretofore several different forms of reflective sheeting have been proposed which include a light-returning layer of small transparent beads or spheres partially embedded in a bonding layer with a light reflecting means being located behind the beads. Such sheets have the property of reflecting back a brilliant cone of light toward the source of an angularly incident ray, and have been called reflex reflectors. Such reflectors are to be distinguished from specular reflectors, such as mirrors, which cause reflector of the incident light in all directions without selective return in the direction of incidence.

Reflex reflecting sheets are used in making signs and markers which have great night time visibility.

It is an object of the present invention to provide an improved method of manufacture of a reflex light reflecting sheeting.

It is a further object of the present invention to produce an improved form of reflex light reflecting sheeting.

Other objects and the nature and advantages of the invention will be apparent from the following description taken in conjunction with the accompanying drawings, wherein.

Figure 1:
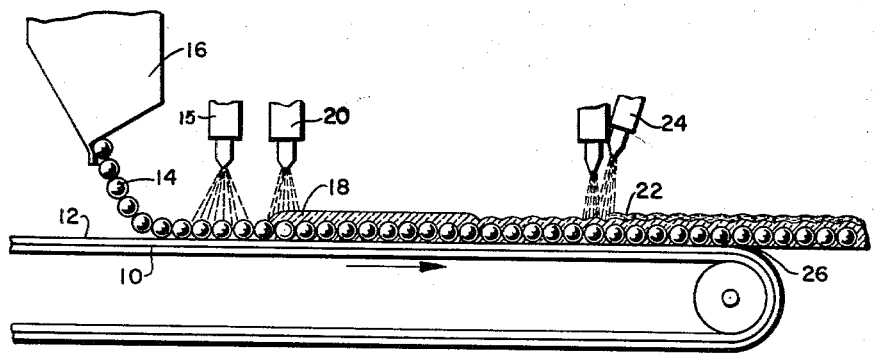
FIG. 1 is a diagrammatic sectional view showing the process of the present invention.
Figure 2:
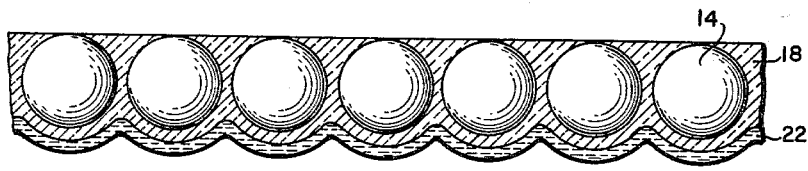
FIG. 2 is an enlarged sectional view of the sheeting made in accordance with the present invention.
Figure 3:
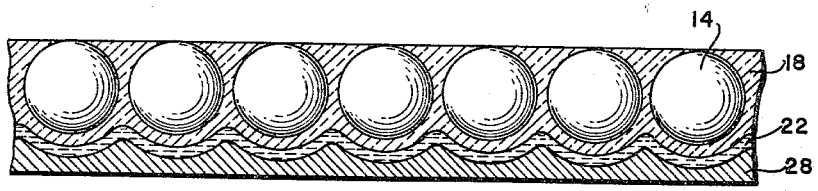
FIG. 3 is an enlarged sectional view of the sheeting of FIG. 2 with a reinforcing layer next to the reflecting layer.
Figure 4:
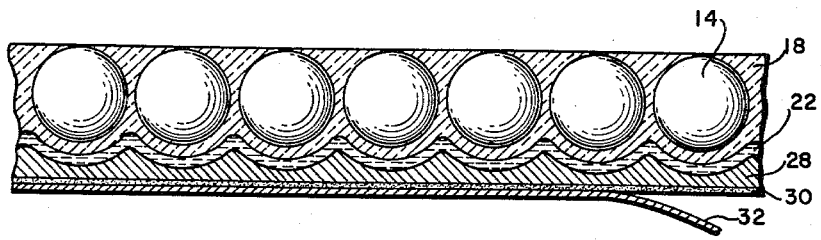
FIG. 4 is an enlarged sectional view of the sheeting of FIG. 3 with an adhesive layer and a removable liner thereon.

Referring to the drawings, FIG. 1 shows diagrammatically the method of the present invention. An endless belt 10 of canvas is provided which has been covered with a coating of a silicone rubber 12.

It has been found that such a silicone rubber coated belt has an attraction for small glass spheres having a high index of refraction of 1.90–2.50 that causes the spheres to adhere to the silicone rubber in a perfect mono-layer. This was quite unexpected in view of the fact that glass spheres of a lower index of refraction, namely, 1.5–1.7, did not have the same effect on silicone rubber. Whereas the high index spheres formed a single layer of spheres in a nearly perfect geometric pattern, the lower index glass spheres formed layers of spheres on the silicone rubber that were in a very irregular pattern. It was determined that when using glass spheres of over 1.90 index, the high dielectric constants of the silicone rubber and the high index glass spheres strongly attracted them to each other. Glass spheres of low index of fraction are believe to have a dielectric constant too low to form a continuous mono-layer by electrostatic attraction.

This discovery has been applied to the present invention wherein glass spheres 14 of high index of refraction are deposited onto the silicone rubber belt as it continuously moved beneath a dispenser 16. The glass spheres 14 form a mono-layer on the belt as indicated above and any excess spheres can be removed by suction, air blast or any other suitable method as indicated at 15. A carefully controlled quantity of a transparent binder 18 is sprayed upon the high index glass spheres 14 as they pass beneath the spray nozzle 20. The binder flows between the glass spheres displacing the air and completely embeds the spheres in the layer of binder. Upon solidification, the lower surface of the sheeting is substantially flat and the glass spheres are in point contact with the lower surface thereof. A thin coating or spacing layer of the binder remains on the top surface of the spheres, and upon solidification assumes the curved shape of the glass spheres. The binder solidifies by curing, cooling, solvent evaporation, or the like, with some shrinkage, which combined with capillary action causes the upper surface of the sheeting to assume the curved shape of the spheres as shown in FIG. 1. A heating means may be provided above the moving sheeting for speeding up the solidification of the binder material.

When the sheeting has solidified, a reflective coating 22 is next formed on the upper curved surfaces of the sheeting. The reflective coating may be applied in various ways, such as by a 2-component spray gun 24 which applies a thin silver coating on the sheet. When the reflective coating has dried, the sheeting is peeled off of the silicone rubber belt, as shown at 26.

If desired, a reinforcing layer 28 can be applied onto the reflective coating by spraying prior to removal from the belt. For certain purposes, a removable liner is desirable and this can be obtained by applying an adhesive coating 30, which is covered over by a removable liner sheet 32. The adhesive coating 30 should be waterproof for sheeting intended for outdoor use. It may be of a solvent-activatable type, or of a heat-activatable type, or one which may be activated to adhesiveness either by use of a solvent or use of heat. Such adhesives are normally non-tacky and require activation at the time of use to produce the desired adhesion or binding to the base surface to which the sheeting is applied, as in making up a sign. A pressure-sensitive adhesive coating may be used, which is normally tacky and adheres to a surface against which it is pressed without need of activation. The removable liner protects the exposed back surface of the adhesive coating, and allows the sheeting to be wound in roll form without any danger of the adhesive material coming in contact with the upper surface of the sheeting. The liner can be of any of the well known types, such as Holland cloth, regenerated cellulose, or the like, which can be readily peeled away from the adhesive surface.

The binder material 18 can be made of any suitable transparent resin that solidifies by curing, cooling, solvent evaporation, or the like, in a relatively short time and with some shrinkage. Examples are methyl methyacrylate, flexible epoxy resins, chloro sulfonated polyethylene, polystyrene, polypropylene, polycarbonate resin, ethyl cellulose, cellulose acetate-butyrate, and the like.

The glass spheres may have a diameter not exceeding 40 mils, but preferably the spheres should have an average diameter not exceeding 10 mils. Excellent results have been obtained by using spheres having an average diameter in the range of 3 to 6 mils. The index of refraction of the spheres should be 1.90 or greater, e.g., in the range of 1.90–2.50.

The method of depositing the reflective coating 22 on the sheeting may be varied as desired. The coating may be silver, aluminum, or the equivalent. Many methods have been proposed for metallizing plastic surfaces and any of these may be used. Instead of the 2-component system where silver is immediately formed, as illustrated at 24, aluminum may be deposited by vacuum or aluminum paint or other reflecting paints may be used.

The reflecting coat 24 is thin and assumes the curved shape of the binder material 18, thus yielding a curved reflecting surface behind each sphere. Such a system may be controlled so that the reflective surface is properly spaced from the spheres so that the focal point of the submerged spheres lies on the reflective surface. The curved, properly spaced reflective surface behind each sphere yields a much better reflection than is obtained in previously proposed sheetings which use a flat reflector surface. The thin layer of transparent binder between the spheres and the reflecting layer acts as a spacing film and its optimum thickness is dependent upon the index of refraction of the glass spheres and their diameters.

The present invention has many advantages. It is a continuous, economical process. The silicone rubber covered belt has a long life, acts to hold the glass spheres in the desired mono-layer pattern by electrostatic attraction, and has release properties which permit the easy stripping of the sheeting therefrom. The finished sheeting has superior reflectivity and angularity.

The transparent binder material 18 may be of any desired color depending on the end use of the sheeting.

It will be obvious to those skilled in the art that various changes may be made without departing from the spirit of the invention and therefore the invention is not limited to what is shown in the drawings and described in the specification, but only as indicated in the appended claims.

What is claimed is:

1. A method of making a flat top reflex reflective sheeting which comprises applying a plurality of small transparent glass spheres having an index of refraction of at least 1.90 onto a silicone rubber surface, said spheres having an average diameter in the range of 3–40 mils, the amount of glass spheres applied being in excess of that needed to form a substantially perfect mono-layer of said spheres, removing the excess glass spheres thereby leaving a substantially perfect mono-layer of said spheres adherent to said surface, said spheres being retained thereon by the attraction between said silicone rubber surface and said glass spheres due to their high dielectric constants, applying a transparent solidifiable binder material onto said spheres until said spheres are completely embedded in said binder material with a layer of said binder material uniformly covering the upper surfaces of said spheres as a spacing layer, solidifying said binder material, applying a thin reflective coating onto the upper surface of said solidified spacing layer of binder, and stripping said sheeting from said silicone rubber surface to yield a flat top sheeting wherein said glass spheres are in point contact with said flat top surface of said sheeting.

2. The method of claim 1 wherein a reinforcing layer of binder material is applied onto the solidified reflective coating layer to yield a flat lower surface thereon.

3. The method of claim 1 wherein said silicone rubber surface is a moving belt.

4. The method of claim 3 wherein said binder material is applied by spraying as said mono-layer of glass spheres on said surface passes below a binder spraying station.

5. The method of claim 1 wherein said reflecting coating is a metal deposited onto said binder material.

6. The method of claim 1 wherein said silicone rubber surface is canvas covered with a coating of a silicone rubber.

7. The method of claim 1 wherein said binder material is so applied that the coating over the spheres assumes the curvature of the upper surfaces of the spheres to form a spacing layer between the spheres and the reflective coating.

References Cited by the Examiner

UNITED STATES PATENTS

| | | | |
|---|---|---|---|
| 1,082,231 | 12/13 | Nale | 18—60 |
| 1,691,721 | 11/28 | Johnson | 18—61 |
| 2,354,048 | 7/44 | Palmquist | 88—82 |
| 2,378,252 | 6/45 | Staehle et al. | 18—57 |
| 2,430,534 | 11/47 | Rodli | 88—82 |
| 2,451,934 | 10/48 | Evans | 264—24 |
| 2,454,910 | 11/48 | Carr | 18—60 |
| 2,543,800 | 3/51 | Palmquist et al. | 88—82 |
| 2,646,364 | 7/53 | Porth. | |
| 2,713,286 | 7/55 | Taylor | 88—82 |
| 2,775,994 | 1/57 | Rowe | 18—60 |

ROBERT F. WHITE, *Primary Examiner.*

MICHAEL V. BRINDISI, ALEXANDER H. BRODMERKEL, *Examiners.*